April 22, 1924.

R. S. CARTER

GATE

Filed Feb. 11, 1922

1,491,029

Inventor

R. S. Carter

By Johnston Laught & Co

Attorney

Patented Apr. 22, 1924.

1,491,029

UNITED STATES PATENT OFFICE.

ROBERT STEWART CARTER, OF CALGARY, ALBERTA, CANADA.

GATE.

Application filed February 11, 1922. Serial No. 535,879.

*To all whom it may concern:*

Be it known that I, ROBERT STEWART CARTER, a subject of the King of Great Britain, of the city of Calgary, in the Province of Alberta and Dominion of Canada, have invented certain new and useful Improvements in Gates, of which the following is a specification.

This invention relates to gates constructed of chain or other flexible material and the primary purpose of the invention is to provide an improved gate of this type adapted to be releasably connected between a pair of gateposts and anchored, in a novel manner, to the ground and to one of said posts whereby the gate, when released, will collapse to the ground always in approximately the same position and in such manner as to leave the gate-way practically unobstructed thereby.

Other objects of the invention will be more readily understood from the following detailed description taken in connection with the accompanying drawings, in which drawings.

Figure 1:
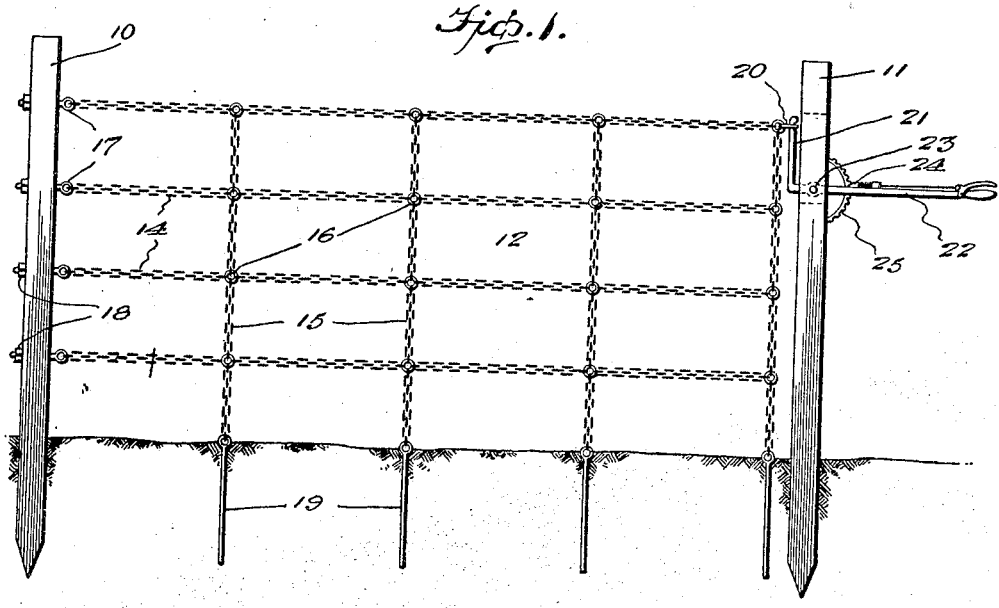
Fig. 1 is a side elevation of a gate constructed and mounted in accordance with my invention.

Referring more particularly to the drawings, 10 and 11 designate a pair of gate posts and 12 a flexible gate adapted to be secured between said posts.

According to the present invention, the gate 12 is composed of spaced rows of horizontal lengths 14 and vertical lengths 15 of chain or other flexible material, connected at points of intersection by rings or links 16. The terminal horizontal lengths 14 at one end of the gate are secured to eye-bolts 17 which pass through the post 10 and are held in position by nuts 18, thus anchoring this end of the gate to the post. The gate is anchored at its lower edge by fixing to the lower vertical lengths 15, suitable anchors in the form of stakes 19 which are driven into or embedded in the ground in any suitable manner.

The end of the gate 12, adjacent the post 11 is provided at the upper corner with a ring or bail 20 engageable with the bent end 21 of a lever 22. This lever is pivoted to the post 11 as indicated at 23 and carries a suitable spring pressed pawl 24, engageable with an arcuate rack 25 to hold the lever in any position to which it may be adjusted.

In the use of the gate, it will be evident that owing to the particular manner in which the gate is anchored at the lower edge and at one end that the same will always tend to fall to the ground in approximately the same position when released by disengaging the bail or ring 20 with the lever end 21. When the gate is stretched across the gateway and ring 20 engaged with the lever, as shown in Fig. 1, the gate may be put under any desired tension within certain limits by releasing the spring pawl 24 and swinging the lever in the desired direction, there being a slot provided in the post 11 to accommodate the bent end 21 when the latter is moved toward the right.

Figure 2:
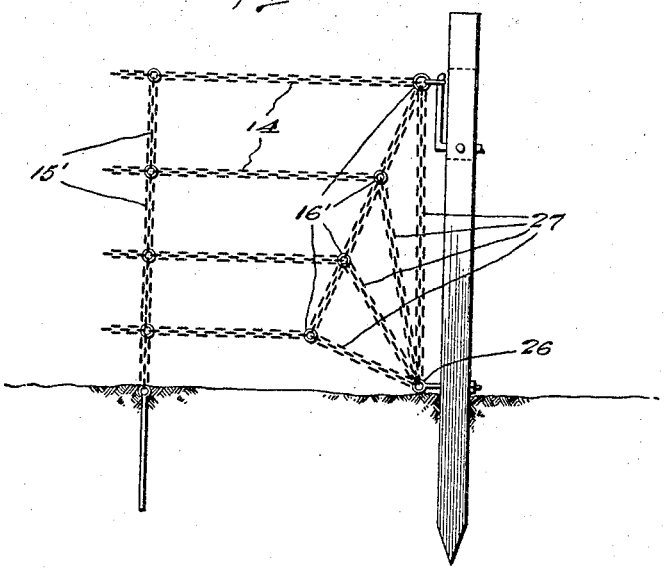
Fig. 2 is a fragmentary elevational view of a modification.

In the modification shown in Fig. 2 the terminal horizontal lengths 14' at the right hand end of the gate are made of varying length, the shortest length being at the lower edge of the gate and the longest length at the upper edge thereof. The extremities of these lengths 14 are interconnected by short lengths 15' which, as shown, are thus inclined outwardly from the lower to the upper edge of the gate. With this form of gate, the post 11 is supplied at its lower portion with an eye-bolt 26 connected, by a series of chains or lengths of other flexible material 27, with the rings 16' at the intersection of the lengths 14' and 15'. With this type of gate, it will be seen that there is a permanent connection of the gate to each of the gate posts instead of only to one post as in the preferred form.

It will be understood that the foregoing description and accompanying drawings disclose only what I now consider to be the preferred embodiment of my invention and, with this understanding, the right is reserved to resort to such modifications in the construction, arrangement and proportion of parts as may later prove desirable, providing of course, that the contemplated modifications do not depart from the spirit or scope of the invention as defined in the appended claims.

Having described my invention, what I claim is:

1. A gate composed of vertical and horizontal lengths of chain material connected at the points of intersection and diagonal lengths of the same material inter-connecting the vertical and horizontal lengths at one end of the gate, and serving to provide for even tensioning throughout the entire gate when the latter is releasably secured between the gate posts under tension.

2. A gate constructed of chain material embodying a brace of the same material and arranged to effect an even distribution or transmission of strain to all parts of the gate when the latter is stretched between gate posts.

3. A collapsible chain gate embodying means arranged to effect even distribution or transmission of the strain imposed by stretching the gate between a pair of gate posts or equivalent supports.

4. A collapsible chain gate comprising vertical and horizontal lengths of chain material connected at the points of intersection and strain distributing means interconnecting the vertical and horizontal lengths at one end of the gate and serving to provide for even transmission of strain throughout the entire gate when the latter is releasably secured to gate posts under tension.

5. The combination with a pair of gate posts of a flexible and collapsible gate adapted to extend therebetween, means anchoring one end of the gate at a plurality of points to one of said posts, means permanently anchoring the remaining end of the gate to the other post at or near the lower edge of the gate, a ring carried by the last mentioned end of the gate at the upper corner thereof and gate supporting and tensioning means carried by the last mentioned posts for engagement with said ring.

6. The combination with a pair of uprights of a flexible gate anchored along one end to one of said uprights and along the lower edge to the ground between said uprights and adjustable gate supporting and tensioning means carried by the remaining upright for engagement with the free end of the gate.

7. The combination with a pair of uprights of a flexible and collapsible gate adapted to be stretched, therebetween, means anchoring the lower edge of the gate to the ground between said uprights, additional means permanently anchoring one end of the gate to one of said uprights, a ring carried by the free end of the gate, a pivoted lever carried by the remaining upright having a hooked extremity adapted to be inserted through said ring and means for holding said lever in various adjusted positions to tension the gate as required.

8. The combination with a pair of gate posts of a flexible and collapsible gate composed of vertical and horizontal lengths of chain material connected at the points of intersection, a plurality of anchor bolts embedded in the ground to which the vertical lengths of the gate are connected at their lower ends, additional anchor bolts carried by one of said posts to which the horizontal lengths of the gate are connected at one end, a single anchor bolt carried by the remaining post at or near the ground level, a plurality of chains connected between said bolt and the remaining ends of the said horizontal lengths of the gate, and gate supporting and tensioning means carried by the last mentioned post for engaging and supporting the upper portion of the adjacent end of the gate.

9. The combination with spaced gate posts of a gate comprising vertical and horizontal strands of flexible material connected at the points of intersection, means anchoring one end of the horizontal strands to one of the gate posts, means anchoring the lower ends of the vertical strands to the ground between the gate posts, a ring carried by the free end of the gate at the upper corner thereof, a lever pivoted to the upper portion of the remaining gate post provided with a hooked terminal adapted to be inserted through said ring, a curved rack carried by the said post in proximity to the lever and a pawl carried by the lever for engaging said rack to hold the hooked terminal of the lever in different adjusted positions to effect the desired tensioning of the gate.

In testimony whereof I hereunto affix my signature.

ROBERT STEWART CARTER.